United States Patent [19]

Goodfellow

[11] 4,057,446
[45] Nov. 8, 1977

[54] PNEUMATIC TIRE MANUFACTURE

[75] Inventor: Anthony Gerald Goodfellow, Maghull, near Liverpool, England

[73] Assignee: Dunlop Limited, London, England

[21] Appl. No.: 579,424

[22] Filed: May 21, 1975

[30] Foreign Application Priority Data

May 28, 1974 United Kingdom ............... 23575/74

[51] Int. Cl.² ............................................. B29H 17/04
[52] U.S. Cl. .................... 156/123 R; 156/125; 156/414; 264/326; 425/51
[58] Field of Search ............... 156/110 R, 123 R, 125, 156/128 R, 128 I, 129, 133, 394 R, 414, 415, 416, 417, 419; 264/326, 328; 425/43, 49, 51; 152/361 R, 361 FP

[56] References Cited

U.S. PATENT DOCUMENTS

| | | | |
|---|---|---|---|
| 1,405,470 | 2/1922 | Wheatley | 156/110 R |
| 2,071,864 | 2/1937 | Myers | 156/110 R |
| 2,145,806 | 1/1939 | Schnedarek | 156/416 |
| 3,218,209 | 11/1965 | Travers et al. | 156/123 |
| 3,223,566 | 12/1965 | Niclas et al. | 156/123 |
| 3,837,986 | 9/1974 | Gortei et al. | 156/125 |

*Primary Examiner*—Charles E. Van Horn
*Assistant Examiner*—John E. Kittle
*Attorney, Agent, or Firm*—Stevens, Davis, Miller & Mosher

[57] ABSTRACT

In the moulding of the tread portion of a pneumatic tire the radially inner surface of the mould cavity is defined by the radially outer surface of an annular former of elastomeric material. The former is contracted, a breaker assembly is built onto it and it is allowed to expand to stress the breaker. In the mould the former is further expanded and is held in compression between mould parts and the breaker to withstand moulding pressure. The former may have inflatable pockets to throw the breaker edges into contact with tire sidewall reinforcements.

5 Claims, 17 Drawing Figures

PNEUMATIC TIRE MANUFACTURE

The present invention relates to the manufacture of pneumatic tires and more particularly to the manufacture of pneumatic tires by moulding processes such as described in the complete specification of our co-pending patent application Ser. No. 619,461, filed Oct. 3, 1975 (which is a continuation of abandoned Application Ser. No. 348,654) or the specification of our co-pending patent application Ser. No. 579,238, filed May 20, 1975 to which reference is hereby made for a clearer understanding of the present invention. A British Pat. No. 1,426,175 corresponds to application Ser. No. 619,461.

In application Ser. No. 619,461 there is described a method of manufacturing a tire in which a tread and breaker portion of the tire is moulded in a tread mould containing an internal former. Thereafter the internal former is removed and the uncured tread portion is joined to sidewall portions which have similarly been moulded in external mould parts (using internal mould parts which have also subsequently been removed) and the assembly of tread and sidewall portions, still carried on their external mould parts, are cured to bond the portions together.

That invention provides a method for the manufacture of a pneumatic tire comprising beads, sidewalls and a tread portion in which the tire is first formed in at least two parts, each part being moulded in a mould cavity from rubber in an uncured state and being provided with a locking sprue to maintain the part in a desired part of the mould, the mould is pressurised, at least when moulding the sidewalls, and opened and the parts of the tire are then brought in contact by means of the mould parts in which they are carried, and joined together under heat and pressure.

Preferably the pneumatic tire is manufactured in at least three parts comprising two sidewalls and a tread portion. Bead cores may be included in the sidewalls, together with rubber bead apices and cord or fabric or other sidewall reinforcements, if desired which may be positioned in the mould cavity prior to forming the sidewalls. Similarly the tread portion may include a breaker or other reinforcement of, e.g. textile cord fabric, steel cord fabric or high modulus polymeric material, which may be assembled or preformed around a core prior to forming of the tread portion.

If desired in one or more parts of the tire a reinforcement may be provided which extends out of that tire part. The tire part is moulded leaving a free flap of reinforcement extending from it. This free flap of reinforcement is held out of the way while its associated tire part is brought in contact with an adjacent tire part and is subsequently itself pressed into contact with the adjacent tire part to bridge the junction between the parts, before the rubber is cured.

The rubber may be any elastomeric, cross-linkable polymeric material, for example natural rubber, butyl rubber, SBR, neoprene, ethylene-propylene rubber and nitrile rubber or mixtures thereof. The type of rubber used will be course depend on the desired properties of the finished tire and the selection and compounding of a suitable rubber for any particular purpose is a well-known procedure in the field of rubber technology.

Although the rubber is to be substantially uncured when used to form the parts of the tire, it is preferred to subject it to a certain amount of working prior to the forming steps in order to destroy its "nerve" or "memory". Suitable working may be, for example, by milling, extrusion or other mechanical or heat treatment but should not be sufficient to start the rubber on its curing cyle. In other words, although the rubber may have been subjected to a certain amount of energy, it is still substantially uncured when used to form the tire parts.

This may be arranged provided that careful attention is paid to the rheometer plot of cure rate vs temperature for the rubber compound used. In general this plot is a curve showing an initial plateau where rate of cure is very low, then a rapid acceleration of the cure rate once a certain temperature, the "threshold" temperature, is reached. In the present invention where the rubber compound has a curve of this kind the temperature of the compound is preferably kept below this threshold temperature at all times during the working, moulding and joining stages and is then heated to above this temperature when curing is to be carried out.

The mould or moulds used in forming the parts may be conveniently pressurized by the introduction of compressed air or other suitable gas, e.g. nitrogen. It is preferred to pressurize by at least 5 pounds per square inch (p.s.i.) but considerably higher pressures may be used if desired.

It will normally be convenient to pressurize the mould by allowing the gas under pressure to enter over the equator of the mould cavities. However, if male formers are used in conjunction with the mould cavities, it may in certain applications be advantageous to introduce the gas through the male formers, e.g. at their poles.

The pressurization of the mould is preferably commenced before opening the moulds for the various parts of the tire and maintained until the parts have been joined and either cooled or cured (if desired the parts after joining may be cooled before the curing has been completed). The pressurization serves to prevent gassing off from the warm compound after moulding and, particularly in moulding the sidewalls acts in conjunction with the locking sprue to keep the moulded part in the correct part of the mould for the joining to be carried out. It will be noted that gassing off from the warm compound is particularly undesirable since it gives rise to ugly pitting of the surface of the moulded tire part and gives rise to porosity in the finished product which can lead to structural failure of the tire in use.

In a further embodiment the invention provides a moulding apparatus comprising at least two mould cavities, means to form moulded parts of a pneumatic tire of rubber in those cavities, the cavities being provided with locking sprue grooves to prevent displacement of the halves, means to pre-work the rubber without any substantial curing prior to its being formed, means to pressurize the mould with gas and means to bring the cavities carrying the tire parts together to join the respective parts together.

The moulding of the tire parts into the mould cavities may be carried out in any convenient manner. For example, male-plug forming, vacuum-forming and combinations of these two techniques may be used for sheet materials. Moreover, the moulding may be carried out by compression, transfer or injection moulding techniques.

The means to pre-work the rubber prior to forming may conveniently be the injection screw of an injection mould or the transferring action of a transfer mould. A combination of the two techniques can be employed whereby a transfer chamber is supplied by a relatively low-temperature screw. For this reason compression moulding alone is not preferred for the method of the invention but it can be satisfactory if the rubber can be "worked" to the desired degree prior to being charged into the compression mould.

The locking sprues will be so shaped as to resist movement of the tire parts in the mould, for example, due to shrinkage or to removal of male formers when the latter are used. The locking sprue is preferably also shaped to ensure that the compressed gas entering the mould during pressurization passes over the lip and onto the surface of the mould half which is to be stripped from its corresponding tire part but does not enter between the tire part and the wall of the moulding cavity on which the tire part is to be carried. This latter effect is in the least undesirable since it causes blistering or similar blemishes on the product and can result in quite unsatisfactory products but it may result in the tire part being lifted out of the moulding cavity on which it should be carried.

Figure 7:
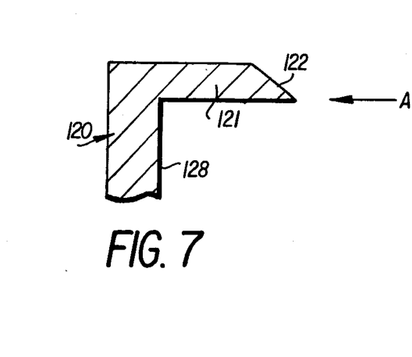
FIGS. 7, 8 and 9 are cross-sections through examples of suitable shaped sprues.
Figure 8:
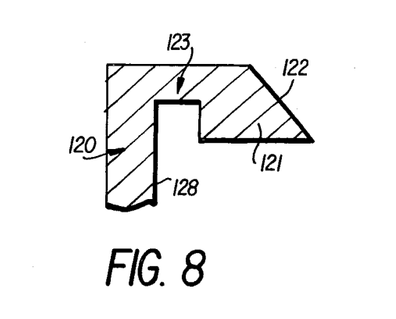
Figure 9:
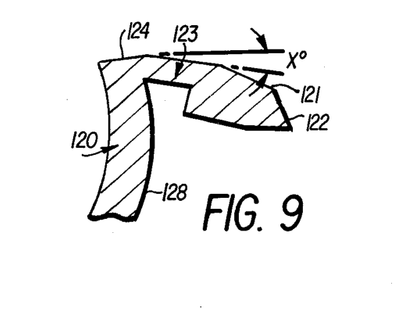

A particularly convenient form of locking sprue is one which consists of a thicker portion connected to the half of the article by a thinner portion. Examples of suitable locking sprues are shown in FIGS. 7, 8 and 9 of the accompanying drawings and are described more fully below.

In the case where a tire is to be moulded in three parts, a tread portion, possibly including a breaker assembly, and two sidewalls, the moulding of all the parts, i.e. the sidewalls and the tread portion, may be carried out using a special locking sprue and mould pressurization as described above. Alternatively in the moulding of the tread portion a part of the tread pattern moulded on the tread portion may be utilized to act as the locking sprue, similarly the former on which the tread portion is moulded may be collapsible or alternatively may be a flat ring which may carry a packing strip e.g. of cured non-adhesive rubber to shape the inner profile of the tread ring. In the former case the tread former may remain inside the tread portion until after the joining stage and the latter case the tread former ring may be slid out of the tread portion laterally before the joining stage.

Pressurization of the tread mould is not essential but pressurization is, however, preferred to maintain intimate contact between the tread portion and the tread moulding matrix, and to prevent gassing off from the warm moulded tread rubber.

The method of the invention enables uncured tire parts to be formed and then brought together without damage. If these uncured parts were formed without the steps of the present invention they would be very susceptible to damage and dislodgement. For example, the uncured parts would tend to stick to male formers as the latter were removed thereby resulting in unsatisfactory moulding. The method of the invention overcomes these difficulties as explained more fully below and enables satisfactory, unblemished tyres to be achieved from substantially uncured parts. Prior methods of moulding tires in two or more parts have usually required at least partial curing of at least one of the parts to prevent their being damaged. These partially cured parts cannot then be satisfactorily joined together unless adhesive is used. The present invention eliminates all these difficulties and extra steps.

A further advantage is that because the tire parts are brought together by means of the mould parts before any curing has commenced, they will be amenable to joining together i.e. the desired article can be formed, with a relatively low degree of interference. The amout of interference is adjusted by means of the allowance of rubber in the tire parts which is made to make sure that the joining surfaces of the parts of the tire carried by the mould parts intimately contact when the mould parts are brought together. It will be appreciated that excess interference at the formation of the joint could result in an unacceptable product, since excess interference at this time can cause undesirable wall-thickening in the area of the joint.

As indicated above, where uncured rubber parts are moulded, there will be a very strong tendency for them to be displaced or torn before they can be joined together, for example, they will tend to stick to the male formers when the latter are removed. Thus the positive means i.e. locking sprues, of retaining the halves in their respective cavities which are provided by this invention are very important. This technique can be further assisted by coating the part of the mould which is to be stripped from the moulded uncured tire part with a suitable non-stick material, e.g. poly(tetrafluorethylene) and by roughening the part of the mould on which the tire part is to be carried. The roughening may be carried out e.g. by shot-blasting.

The invention is illustrated, by way of example only, in the accompanying drawings in which.

FIG. 7 a moulded tire part 120 (illustrated schematically) is formed having a sprue 121. Sprue 121 has a cut-away surface 122 so inclined that pressurized gas introduced into the mould in the direction of arrow A, will deflect over the cut-away surfaces and thereby will not get between the moulded part and the surface of the mould itself, i.e. the tendency for the gas to get between surface 128 i.e. the exterior of the finished product, of the moulded part and the surface of the mould itself is effectively reduced.

In FIG. 8 is shown a differently shaped sprue. This sprue is connected to the moulded tire part 120 by means of a narrow moulded portion or neck 123. Trimming of the finished moulded product is made easier by virtue of this narrow portion 123. Again the sprue has a cut-away surface 122 to control the flow of gas into the moulding.

FIG. 9 shows a particularly preferred type of sprue. This has all the features of the sprue of FIG. 8 but has been formed at a small angle X° from the normal with the moulded part. X° can conveniently be up to 45°. By this means the two sprues are prevented from joining together when the parts are joined together at surface 124.

Joining together of the two sprues may cause undesirable joint deformation.

Figure 10A:
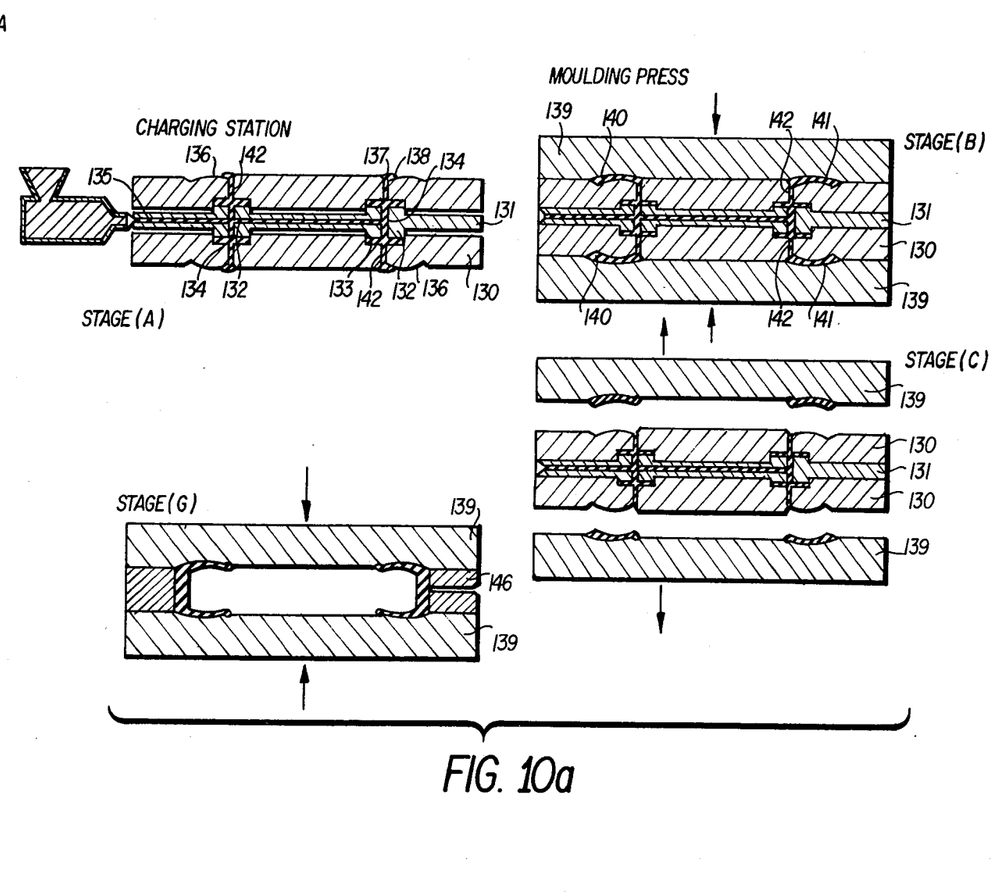
FIG. 10 shows schematically a process and apparatus for the manufacture of a pneumatic tire.
Figures 10B, 11:
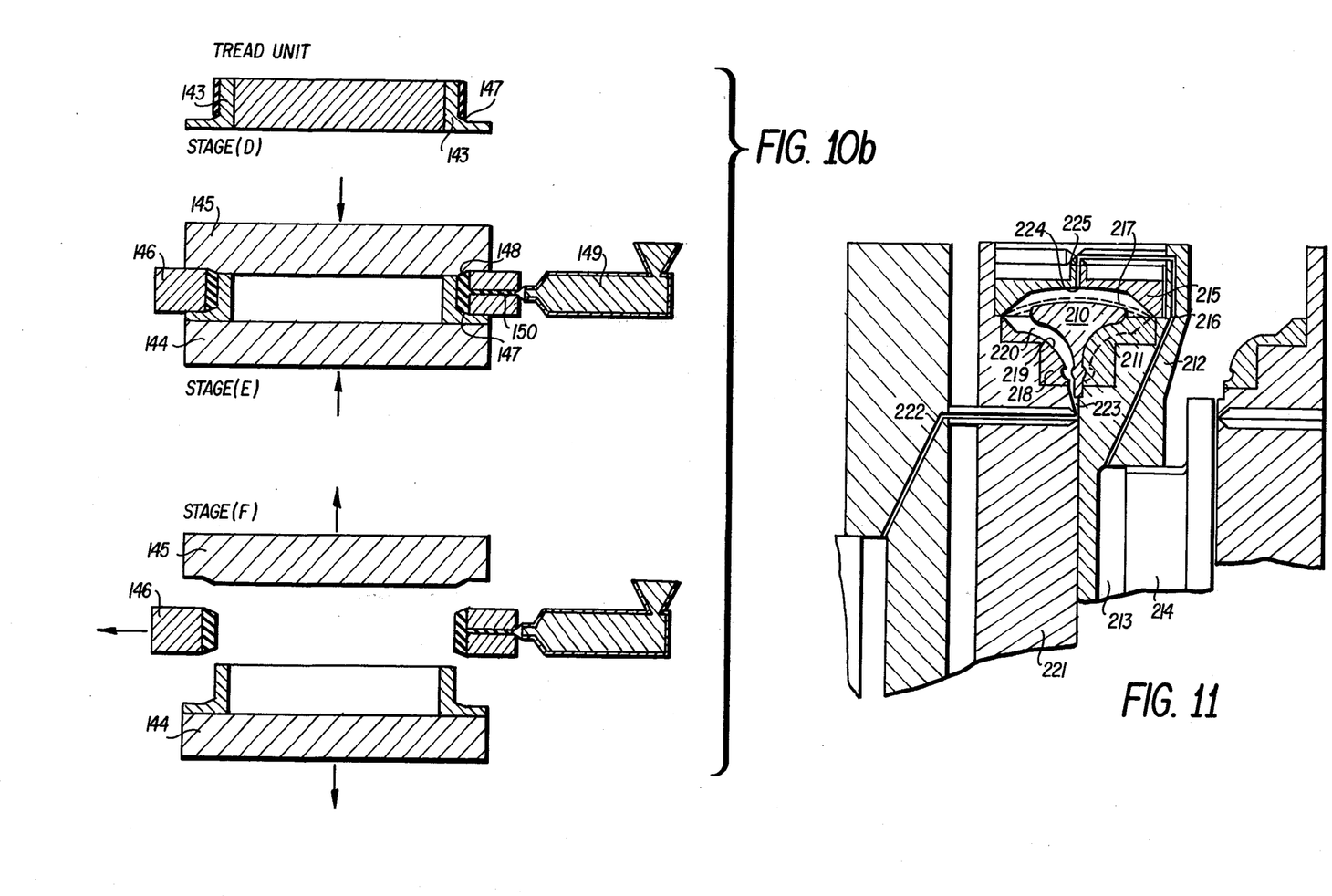

FIG. 10 illustrates schematically the stages of an operation of process and apparatus for making a tire, FIG. 10a showing the moulding of the tire sidewalls and joining the sidewalls to the tread, and FIG. 10b showing the moulding of a tread portion. As shown, at Stage (A) a pair of sidewall units 130 are assembled on either side of a centre platen 131. The platen 131 has annular raised portions 132 the sidewall units each having a corresponding groove 133 of slightly greater depth.

The platen 131 contains passages 134 from an inlet 135 connected to a screw-injector to the surface of the platen at the center of the raised annular portions, and the sidewall units 130 each contain passages 142 from the groove 133 to a moulding face 136 shaped to form part of a moulding cavity for a tire sidewall.

In operation the sidewall units 130 are assembled adjacent to the platen 131 the raised portion 132 co-operating with the groove 133 to form a transfer chamber and rubber is injected through the passages 134 to fill the transfer chamber so formed. Beads 137 assembled with apices 138 are placed in position on the moulding faces 136 of the sidewall units.

At stage (B) a pair of moulding press platens 139 with moulding faces 140 brought into intimate contact with the sidewall units 130 to form sidewall mounding cavities 141. Pressure is then applied by the moulding press to force the rubber from the transfer chambers through the passages 142 into the sidewall moulding cavities 141.

The moulding press platens 139 each contain sprue grooves (not shown) adjacent their moulding faces 140.

At stage (C) the mould is pressurized or a chamber containing the mould is pressurized and the moulding press platens 139 are lifted from the sidewall units 130. The provision of sprue grooves in the platens 139 effectively prevents air getting between the moulded sidewall and the face 140 and assists in holding the moulding to the platen so that the moulded sidewalls are lifted away from the sidewall units and carried by the press platens.

The sidewall units 130 and center platen 131 are then removed ready to be used again for stage (A).

In stage (D) a breaker assembly is built up on a former 143.

In stage (E) the former 143 is clamped between a pair of press platens 144 and 145 together with a ring 146 which is concentric with the breaker former. The ring 146 carries a tread pattern on its interior face and the ring 146 breaker former 143 and upper press platen 145 together define a moulding cavity for a tread portion of a tire. An angled face 147 is provided on the former 143 and a corresponding one 148 on the upper platen 145 so that the tread portion is moulded with angled side faces to be joined with matching faces on the moulded sidewalls.

The ring 146 contains passages 150 leading from a screw injector unit 149 to the interior face of the ring and the rubber forming the tread portion is thus injected into its moulding cavity.

In stage (F) after moulding the mould platens 144 and 145 are disengaged from the moulded tread portion, air pressure being introduced into the mould. The breaker former 143 is removed and the ring 146 detached from the injector unit 149. It may not be necessary to provide a separate locking sprue for the tread portion of the tire since the tread portion carried on the tread ring can itself serve as the locking sprue.

It will be appreciated that in all the stages described up to this point the rubber has been worked by the screw injectors to a temperature at which it is mouldable but is below the temperature at which an appreciable rate of cure is begun. This temperature depends upon the shape of the rheometer plot of cure rate vs. temperature for the rubber compound used. In general these curves show an initial plateau on which the rate of cure remains very low but once a certain temperature, the "threshold temperature", is reached the rate of cure begins rapidly to increase. We have found that by careful control and planning of the stages (A) to (F) these can all be carried out with the rubber below the threshold temperature. Different rubbers can be used in different parts of the tire provided that their rheometer curves match sufficiently to enable them to cure together at an elevated temperature to give an adequate bond between them.

Stages (A), (B) and (C) may be performed at the same time as stages (D), (E) and (F) and in stage (G) the tread portion carried by the tread ring 146 is positioned between the moulding press platens 139 carrying the sidewalls. The moulding press platens are brought up to the tread ring so that the sidewalls and tread portions contact along annular angled faces. At this stage the rubber is still warm but below the threshold temperature. The temperature is now raised to cure the hitherto uncured rubber. If desired internal gas pressure, e.g. air or steam, may be introduced into the mould at this stage to press the tire firmly into the moulding surfaces during curing.

Finally, the mould platens are again separated, the cured tire is removed from the mould and the spures cutaway.

The tread portion of the tire may if desired be produced with a concave inner face to blend more smoothly with the sidewall contour. In this case the former 143 on which the tread portion is moulded may be collapsible or may be covered with a shaped spacer ring of, e.g. a cured ethylene propylene rubber, which will permit the cylindrical former to be removed and will then readily be stripped from the interior of the tread.

In addition the angle and position of the joint between the tread portion and sidewalls need not be as shown in the drawings the essential factor being that the joint must be positioned so that the parts can be pressed or sheared together during the closing of the platens 139 on the tread ring 146 in stage (G).

However, it is desirable that a breaker built in the usual way from filamentary (e.g. textile) plies should be in a stretched condition when the tire tread portion is moulded onto it and cured.

In application Ser. No. 579,238 there is described a method of manufacturing a tire of the kind in which the axial width of the tread portion is greatly in excess of the gap between the beads, in which method concave sidewall portions are moulded on either side of the tread former while the former is still supporting the tread portion. With such a design of tire it would obviously be difficult, if not impossible, to remove a rigid former from the interior of the finished tire without damage to the tire.

According to the invention there is provided a method for the manufacture of a pneumatic tire comprising initiallly moulding the tread portion of the tire from uncured rubber in an annular mould cavity the radially inner surface of the cavity being the surface of a mould core of cured rubber, the mould core having substantially the shape of the interior of the tire to be moulded, and being supported during moulding of the tread by rigid side plates which engage the sidewall moulding surface of the core, removing said side plates after moulding said tread, replacing them by mould halves defining sidewall moulding cavities against the sidewall moulding surface of the core and forcing uncured rubber into the sidewall moulding cavities to mould said sidewalls onto the tread.

The moulding of the tread and of the sidewalls may be by injection or transfer moulding. Preferably the sidewalls are moulded not simultaneously but in succession to avoid movement of the core.

Preferably an inextensible reinforcing belt is inserted into the tread mould cavity prior to moulding the tread, the uncured tread rubber thus being moulded onto a pre-assembled reinforcement. The sidewalls preferably do not contain plies of reinforcing fabric, and consist entirely of rubber except, possibly, for an inextensible bead core.

The cured rubber core is preferably in a state of radially inward compression when the tread is moulded the reinforcement around the core thus being in a state of tension.

The rubber of the sidewalls and tread is preferably cured prior to removal of the core, the latter being preferably coated with a suitable release agent to permit its removal. The removal of the core is facilitated by the fact that it is made of rubber which is flexible. It will be appreciated that whilst the rubber core is rigidly supported by the mould halves or side plates its very high modulus in compression enables it to act as a suitable core. When the support is removed the flexibility of the core enables it to be readily distorted to be removed from the moulded tire.

Preferably the uncured rubber used in moulding the tread portion of the tire has been mechanically worked by a feed screw, sufficiently to destroy its nerve or memory without starting it on its cure cycle, i.e. the rubber is warm but is below the threshold temperature at which its cure rate begins to rise rapidly.

The invention will now be described in more detail by way of example only with reference to the accompanying drawing FIG. 11, which is a cross-sectional view of a moulding apparatus.

The drawing is in two halves (a) and (b) of which (a) illustrates the apparatus as used during moulding of the tread and (b) illustrates the apparatus as used during moulding of the sidewalls.

As shown in part (a) the apparatus consists of a rubber core 210, supported by a side plate 211 contoured to the shape of the core 210. The side plate 211 is carried on a press platen 212 in the center of which is a cavity 213 which forms a transfer chamber into which worked uncured rubber may be loaded through an inlet (not shown). A plunger 214 co-operates with the cavity 213 to permit the rubber to be forced from the chamber by compressing the plunger 214 into the cavity 213.

The interior and exterior surfaces of the tread moulding cavity are defined by the core 210 and a tread moulding ring 215. The ring 215 is divided along its center line, by an annular gate 224 surrounded by an annular reservoir 225 connected by runners 216 to the cavity 213 to permit the rubber to be transferred from the cavity 213 into the tread moulding cavity.

An inextensible reinforcing band 217 is located on the core before inserting the core into the tread moulding cavity.

After moulding the tread and partially curing the tread rubber the side plate 211, plate 212 and plunger 214 are replaced by a mould half 218 carrying a sidewall moulding surface 219 which is brought up to the core 210 to define a sidewall mould cavity 220. The mould half 218 is supported on a plate 221 containing runners 222, 223 from an injection system (not shown).

Sidewall rubber is then injected into the cavity 220, and joins with the tread rubber. The other sidewall is similarly moulded in a subsequent operation since it would be difficult to balance the flow into the two sidewall cavities if both were filled simultaneously.

The tire is then cured whilst maintaining the temperature of the runners below the threshold temperature. The plates 221 are taken away and the core 210 removed from the interior of the cured tire.

It will be appreciated that throughout this process it is necessary to control accurately the temperatures of all the parts of the apparatus. This is achieved by the provision of many channels for heating and cooling fluids which are not shown in the drawing.

The process of this invention may be utilized to manufacture tires of conventional shapes i.e. having convex sidewalls but it is also particularly suitable for the manufacture of tires having concave sidewalls which operate in compression as described.

According to one aspect of the present invention there is provided a former for use in moulding the tread portion of a pneumatic tire, the former comprising a solid or substantially solid annulus which is of greater axial length than radial thickness in radial cross-section and which is of an elastomeric material which will yield to permit the diameter of the former to be increased or diminished. By "substantially solid" is meant that the annulus may be slitted or incorporate small apertures to alter its behaviour during deformation, but such slits or apertures do not remove any substantial proportion of the material of the annulus which remains effectively a solid body.

The annulus is preferably provided with a formation or formations whereby it may be engaged by means arranged to contract and/or expand the annulus. In radial cross-section the annulus may be part of a generally T-shaped body, the stem of the T projecting radially inwardly of the annulus in the region of its central plane. The stem may be of enlarged cross-section at a position along its length spaced from the junction between the stem and cross-piece of the T to provide an anchor block or rib whereby the stem may be gripped to allow a radially inward pull to be exerted on the annulus when it is desired to reduce its diameter. The radially inward surface of the annulus may taper toward its central plane to provide conical or inclined surfaces engageable by correspondingly inclined surfaces of mould parts movable axially inwardly of the annulus from opposite ends thereof toward its center thereby to displace the annulus radially outwardly and enlarge its diameter.

When these two engaging means are combined in the same former the conical or inclined surfaces will be on opposite sides of the anchor block or rib.

In accordance with another feature of the invention the annulus may be provided at its axial ends with annular inflatable pockets adapted, on inflation, to project axially outwardly and radially inwardly with respect to the annulus. These pockets are provided to consolidate the ends of breaker plies with the sidewall reinforcement, and in use are arranged so that carcass reinforcement plies for the tread region of the tire can be laid on the radially outer surface of the annulus initially with their opposite edges wrapped around and tucked into the axial ends of the former, while the pockets are in an uninflated condition. When subsequently tire sidewall portions are placed in contact with the tread portion formed over the breaker the pockets are inflated to displace the breaker carcass ply edges away from the former and into contact with the sidewall portions. The former may be a layered structure comprising layers of elastomeric material of different hardness, the hardest being in the radially outer side.

In accordance with yet another feature of the present invention there is provided a method of manufacturing a pneumatic tire with the aid of a former as defined in any of the four immediately preceding paragraphs, the method comprising building or locating an annular, substantially inextensible breaker on the radially outer surface of the former, increasing the diameter of the former to stretch the breaker, locating the former with the breaker in a stretched condition thereon in a mould, moulding a tire tread portion over the stretched breaker on the radially outer surface of the former, locating or moulding tire sidewall portions in contact with the tread portion, curing the tire and removing the former from the interior of the cured tire.

The method preferably comprises gripping the former between jaws which move axially inwardly of the annulus toward one another and locate behind the anchor block of the former, the jaws being so shaped that when gripping the stem portion of the former they expose the radially outer surface of the former. The jaws are moved radially inwardly of the former to contract the former to a diameter less than that which it has in its unstressed condition. A breaker assembly, which may include a carcass reinforcement ply or plies and other components such as edge strips or fillers is now built or located on the radially outer surface of the former, after which the former is released from the jaws so that in resuming its normal diameter it tends to stretch and firmly hold the breaker.

In the subsequent tire moulding process the former, with the breaker mounted thereon, is again gripped by parts of the mould similar in shape to the jaws and having inclined surfaces which co-operate with those of the former to produce an expansion of the former beyond the diameter it has in its unstressed condition, thereby further stretching the breaker.

In this position the former is surrounded on all sides except its radially outer surface by parts of the mould and is in compression between mould parts and the breaker and is therefore sufficiently rigid to withstand moulding pressure when a tread portion for the tire is now moulded over the stretched breaker in a mould cavity of which the radially outer surface of the breaker carried on the former is a part.

The method may include wrapping opposite edges of carcass plies around the axial ends of the former with pockets at said ends in an uninflated condition and, subsequent to forming the tread over the breaker and to forming or providing sidewall portions of the tire in contact with the tread portion but prior to curing the tire, inflating the pockets to displace the carcass ply edges into contact with the tire sidewalls.

Preferred embodiments of the invention will now be described with reference to the accompanying drawings, in which.

Figure 1:
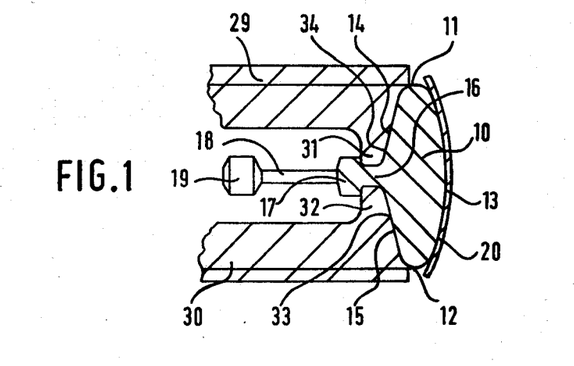
FIG. 1 is a radial cross-sectional view of a former in accordance with the invention shown as gripped by jaws on its opposite sides, the view being taken on the line 1—1 of FIG. 2.
Figure 2:
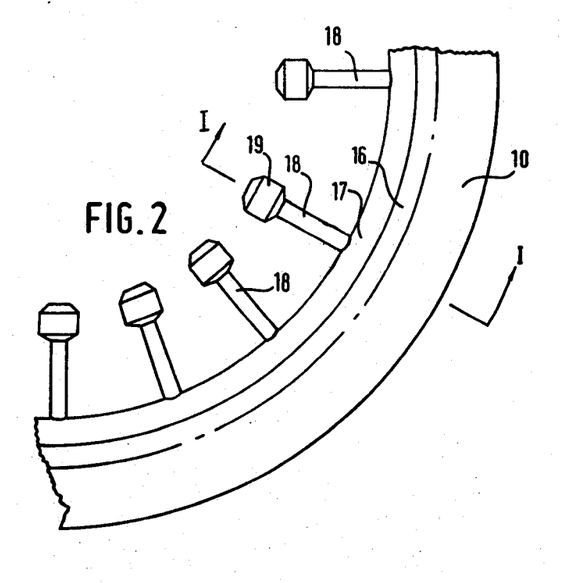
FIG. 2 is a partial plan view of the former of FIG. 1 with the jaws removed.
Figure 3:
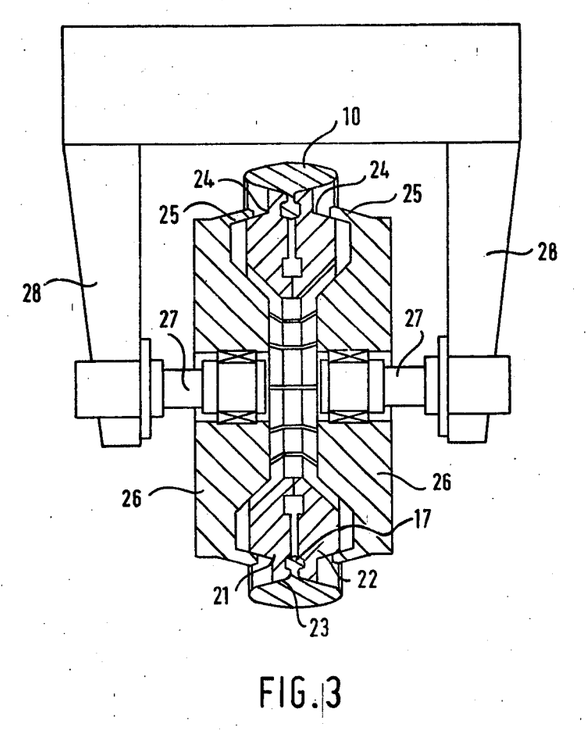
FIG. 3 is a sectional elevation of the former of FIGS. 1 and 2 mounted on a machine for contracting the former.

The former 10 illustrated in FIGS. 1, 2 and 3 is an annulus of an elastomeric material having bulk and shear moduli such that the former has relatively high resistance to changes of volume but relatively small resistance to changes of shape. It will be seen that the radially outer part of the former is approximately of elliptical cross-section, being elongated in its axial direction with rounded ends 11 and 12, having a radially outer surface 13 which is a curve of large radius in the axial direction and having a radially inner surface which tapers toward its center so as to provide two inclined frusto-conical surfaces 14 and 15.

The former 10 is T-shaped in radial section, an annular stem portion 16 extending radially inwardly of the annulus at its center between the inclined surfaces 14 and 15. The inner end of the stem 16 is of enlarged cross-section to provide an anchor block or rib 17. Extension stalks 18 may be provided to extend radially inwardly from the step portion 16 and may terminate at their free ends in blocks 19. The purpose of the stalks 18, which may be of metal and which may be secured to the former 10 in any known suitable way, is to provide means whereby the former may be gripped to remove it from the interior of a finished tire if the structure of the tire is such that access cannot easily be had to the anchor block 17.

Prior to building or locating a breaker structure (tread reinforcement) indicated at 20 in FIG. 1 on the radially outer surface of the former 10 the diameter of the former 10 is reduced on the machine illustrated in FIG. 3. Segmented annular jaws 21 and 22 engage the stem and anchor block of the former 10 in corresponding grooves, the outer peripheral surfaces 23 of the jaws being shaped to conform to the inclined surfaces 14 and 15 of the former. Each jaw 21 and 22 also has an inclined surface 24 which co-operates with an inclined lip 25 of an associated hub 26. The two hubs 26 are mounted on respective, co-axial pneumatic or hydraulic rams 27 on arms 28 of the machine. When the rams 27 are actuated to move the hubs 26 toward one another the lips 25 rise over the surfaces 24 to displace the segmented jaws 21 and 22 radially inwardly and in view of the engagement of the anchor block 17 between the jaws 21 and 22 the diameter of the former 10 is correspondingly reduced.

Figure 5:
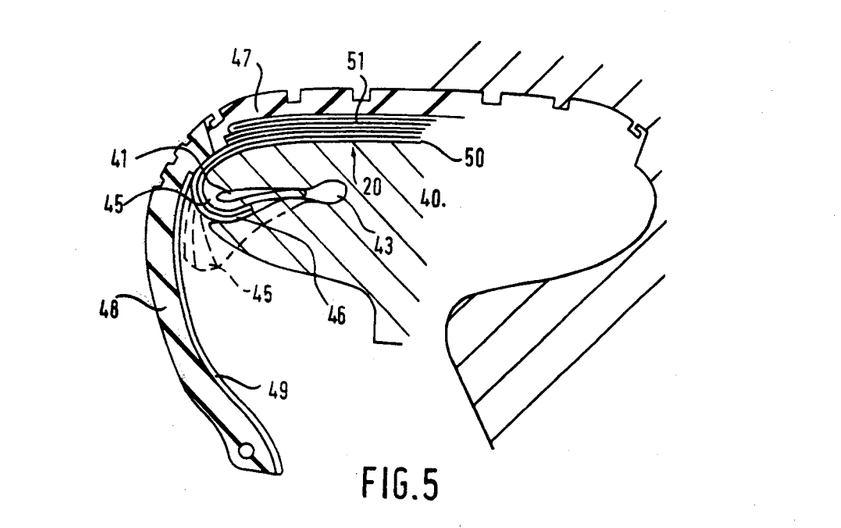
FIG. 5 illustrates the operation of placing the edges of carcass plies in contact with the tire sidewall by means of the former of FIG. 4.

With the former 10 in a reduced-diameter condition the breaker 20 is built or located on its radially outer surface 13. As illustrated in FIG. 5, the breaker assembly 20 includes a folded breaker 51 proper, and also a subjacent, two-layer carcass ply crown portion 50 which, in a radial tire will be a 90° ply. The edges 46 of the carcass ply crown portion 50 are to be joined to carcass ply reinforcements 49 of the sidewalls of the tire, for example as described in Patent Application Ser. No. 457,507, filed Apr. 3, 1974, now abondoned.

According to that invention there is provided a radial ply pneumatic tire comprising a tread portion, two sidewalls each terminating in a bead region, a breaker assembly located in the tread portion of the tire and at least one carcass reinforcement member extending from one bead region of the tire to the other, the carcass reinforcement member comprising a central ply disposed in the tread portion of the tire with its edges disposed axially outwardly of the breaker assembly and, in each sidewall, a sidewall ply extending radially outwardly from each bead region of the tyre to overlap said central ply, its radially outer edge being disposed axially outwardly of the breaker assembly thereby to form an overlap joint disposed axially outwardly of the breaker assembly, the overlap joint in the two sidewalls being substantially symmetrically arranged with respect to the mid-circumferential plane of the tire.

The overlap joints may be located in the sidewall of the tire radially outwardly of the widest part of the tire, and preferably in the shoulder region of the tire.

The radial ply pneumatic tire is preferably provided with one or more additional reinforcing plies. These additional reinforcing plies may be disposed in the sidewall of the tire extending radially outwardly from the bead region and terminating radially inwardly of an edge of the central ply and in the bead portion of the tire extending axially outwardly of the breaker assembly and terminating radially outwardly of each sidewall ply.

A joint reinforcing ply may also be provided in the tire to overlap a part of the sidewall ply and a part of the central ply.

The tire may comprise a single carcass reinforcement member in which case the overlap joints are preferably at least 15 mm or a plurality of carcass reinforcement members in which case each overlap joint is preferably at least 10 mm.

The manufacture of a radial ply pneumatic tire according to the present invention can be carried out using a conventional tire building method as hereinbefore described.

Specific examples of radial ply pneumatic tires according to the present invention will now be described, by way of example, with reference to the accompanying drawings in which FIGS. 12 to 16 are diagrammatic representations of five different radial ply pneumatic tires.

Figure 12:
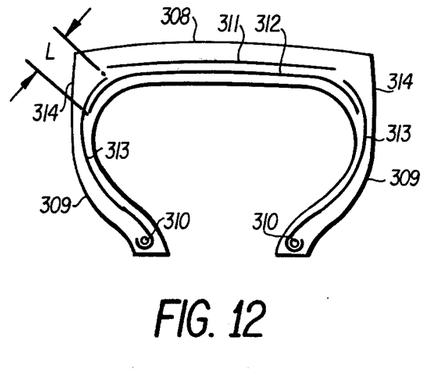

The tire illustrated in FIG. 12 comprises a tread 308 and two sidewalls 309 each terminating in a tire bead 310. A breaker assembly 311 underlies the tread 308 and a single carcass reinforcement member comprising a central ply 312 and two sidewall plies 313 extends from one tire bead 310 to the other. Each edge of the central ply 313 is disposed axially outwardly of the breaker assembly 311 in a shoulder region 314 of the tire and each sidewall ply 313 extends radially outwardly from its associated bead 310 so that its radially outer edge crosses an edge of the central ply 312 to form an overlap joint in the shoulder region of the tire axially outwardly of the breaker assembly 311. The overlap joints are disposed symmetrically with respect to the mid-circumferential plane of the tire. The length L of the overlap joint formed between the edges of the central ply 312 and each sidewall ply 313 is greater than 15 mm.

In the manufacture of the tire using a conventional tire building method the uncured tire containing its carcass reinforcement member is placed on a central inflatable moulding bag with the tire beads resting on end plates of the bag. As the mould closes each bead is transferred to a bead locating ring and the breaker assembly subsequently pushed toward the periphery of the mould as the moulding bag is inflated. During this operation the central ply 312 and each sidewall ply 313 are able to slide relative to each other at quite low tensions and consequently tension variations will be reduced and therefore less likely to cause radial displacement of the bead. The tire is then cured whereupon the adhesion between the overlapping edges of the central ply and sidewall ply is sufficient to establish a strong joint between the plies in the cured tire.

Figure 13:
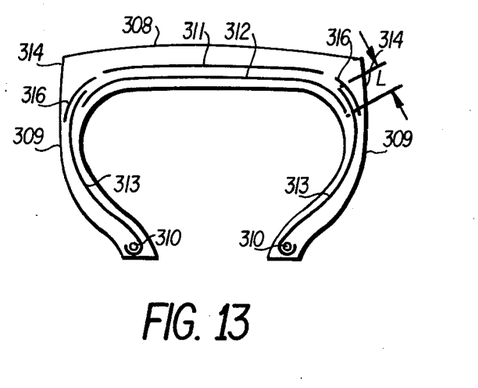

The tire illustrated in FIG. 13 is similar to that illustrated in FIG. 12 except that a joint reinforcing ply 316 is disposed radially outwardly of the overlap joint between the central ply 312 and the sidewall ply 313.

Figure 14:
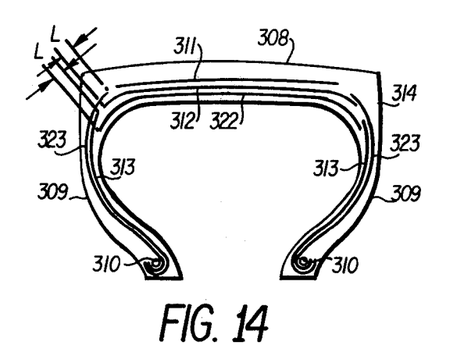

The tire illustrated in FIG. 14 comprises two carcass reinforcement members each comprising a central ply 312, 322 and associated sidewall plies 313, 323. The length of the overlap joints formed in each carcass reinforcement member between the edges of the central ply and the sidewall reinforcing ply are each not less than 10 mm and, in each carcass reinforcement member the overlap joints are disposed symmetrically on either side of the mid-circumferential plane of the tire.

Figure 15:
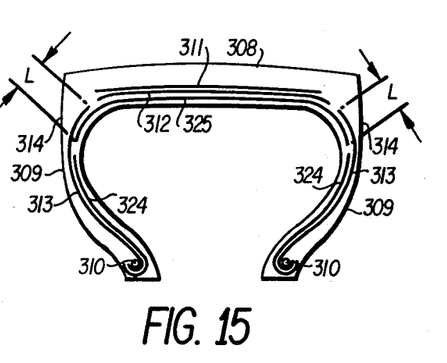

The tire illustrated in FIG. 15 is similar to that illustrated in FIG. 1 but includes additional reinforcing plies 324, 325. One reinforcing ply 324 extends radially outwardly from the bead region to terminate radially inwards of the central ply 312 and thus leave a small gap between the edge of the additional reinforcing ply 324 and the edge of the central ply 312. The other reinforcing ply 325 extends axially outwardly beyond the breaker assembly 311 and terminates radially outwardly of the sidewall ply 313 to leave a gap between the edges of the sidewall ply 313 and the reinforcing ply 325. The length of the overlap joint formed between the edges of the central ply 312 and the sidewall ply 313 is greater than 15 mm.

Figure 16:
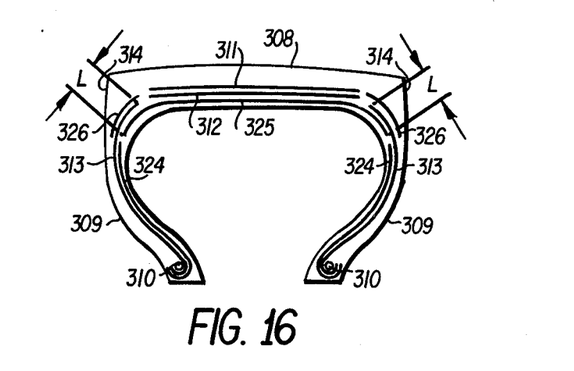

The tire illustrated in FIG. 16 is similar to that illustrated in FIG. 15 except that a further reinforcing ply 326 is disposed radially outwardly of the carcass reinforcement member to overlie the overlap joint between the edges of the central ply 312 and the sidewall ply 313 and the gaps between the additional reinforcing plies 324, 325 and the central ply 312 and the sidewall ply 313.

In the tires illustrated in FIGS. 12 to 16 the overlap joints are disposed axially outwardly of the breaker assembly 311 in the shoulder region of the tire. The disposition of the overlap joints in the shoulder regions of the tire is particularly desirable if the tire is to be manufactured by a conventional tire building method since in the initial shaping of the tire the pressure exerted by the moulding bag is least in the shoulder region of the tire and consequently the sidewall ply and central ply can slip relatively easily over each other to effectively equalize the length of the portions of the carcass reinforcement member between the tire bead 310 and the breaker assembly 311.

The carcass ply of the breaker assembly is a 90° ply, that is, at least the majority of the fibres or filaments forming this ply extend axially, rather than circumferentially, with respect to the former 10. The folded breaker plies are low-angle plies, i.e. plies in which the cords make angles of, say, 17° with the circumferential direction of the former.

After locating or building the breaker assembly 20 on the former 10 the diameter of the former is increased to stretch the breaker and maintain it tightly on the former. This can be done either by expanding the former or simply by removing the contracting force exerted by the machine illustrated in FIG. 3 so that the former stretches the breaker assembly 20 in tending to resume the diameter which it possesses in the unstressed condition.

The former 10 with the breaker assembly 20 in a stretched condition thereon is now located in a mould which includes platens 29 and 30 having the configuration generally as illustrated in FIG. 1. The platens 29 and 30 are moved toward one another axially of the former 10 so that their inwardly projecting lugs 31 and 32 engage the stem 16 behind the anchor block 17, the inclined peripheral surfaces 33 and 34 of the platens meanwhile engaging the inclined surfaces 14 and 15 of the former to tend to increase the diameter of the former 10 against the resistance of the breaker 20. In this way the former 10 is placed under a compression load and at the same time is supported on all surfaces except its radially outer one which forms part of the mould cavity for the tire tread portion.

Moulding of a tire tread portion onto the former 10 to incorporate the breaker 20 is carried out generally as described in either of our co-pending patent applications Ser. Nos. 619,461 or 579,238, to which reference is hereby made to give a clearer understanding of the present invention. It will be noted that in view of the axially elongated shape of the former 10 the body of elastomeric material is relatively thin in the radial direction. The former 10 is fully supported by the members 29 and 30 and is in compression between the members 29 and 30 and the breaker assembly 20. These factors combine to ensure that the former 10 when located in the mould and immediately prior to the transfer of rubber into the tread forming cavity of the mould, has sufficient rigidity to resist the moulding pressure.

As described in our co-pending patent application No. 619,461, sidewall portions for the tire are separately moulded and joined to the tread portion, the tire is cured and thereafter the former 10 is removed from the interior of the finished tire. As described in our co-pending patent application No. 579,238, however, the former may be suitably shaped to correspond with the internal shape of the tire and thus permits the removal of the members 29 and 30 after formation of the tread portion of the tire and their replacement by members which define with the radially inner surfaces of the former, cavities in which sidewalls for the tire are moulded in situ against the tread portion. In such a construction the sidewalls are concave and taper toward the beads which are nearly in contact. In the finished tire, therefore, the former is almost wholly enclosed and it is therefore vital that it should have little resistance to change of shape to permit its removal from the tire without causing damage to the latter. The shape of the former according to the present invention is such that although having sufficient rigidity when supported by the mould parts 29 and 30 it is sufficiently flexible and deformable to permit its subsequent removal from a finished tire without damage thereto.

Figure 4:
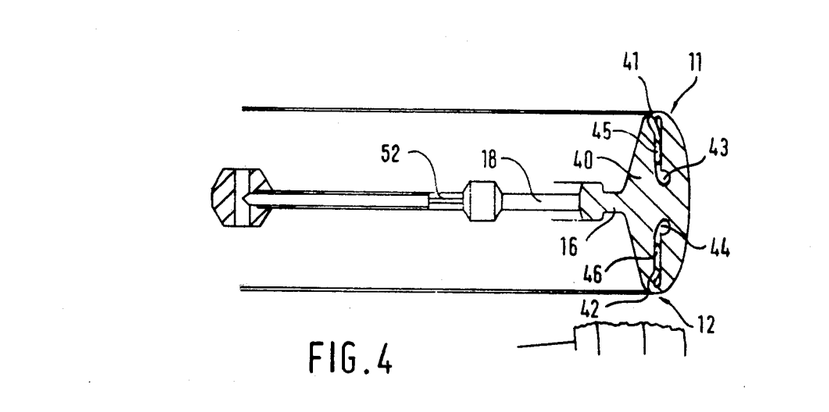
FIG. 4 is a radial section of a modified former.

The breaker assembly 20 will normally comprise a 90° ply in which the cords extend axially with respect to the former 10. A problem may arise in properly applying the edges of the carcass ply at the axial ends 11 and 12 of the former to the tire sidewalls or tire sidewall reinforcements. In accordance with another feature of the present invention illustrated in FIGS. 4 and 5 this problem is overcome by providing at the axial ends 11 and 12 of the former 40 annular pockets 41 and 42, respectively, formed by securing in axial slits in the former 40 the free ends 43 and 44 of membrane extensions 45 and 46.

The openings of the slits in the former 40 at the ends 11 and 12 of the former provide nips under the membranes in which the opposite edges of the carcass ply can be inserted to hold them in position during tread moulding and during the joining of uncured sidewall portions to the moulded tread portion. FIG. 5 illustrates the use of the pockets 41 and 42 subsequently to apply the carcass ply edges to the sidewall reinforcements.

As illustrated in FIG. 5 the tire tread portion 47 is moulded on the former 40 so as to incorporate the stretched breaker 20. At this stage the edges 46 of the 90° carcass ply are engaged in the nip at the opening of the slit in the former where the reversely folded membrane 45 forms the pocket 41. This engagement of the ply in the nip assists in preventing displacement of the ply during the moulding of the tread portion 47.

In a subsequent moulding operation, as described in our above-mentioned co-pending patent application Ser. No. 619,461, an uncured sidewall portion 48 (see FIG. 5) having an internal reinforcement 49 is moulded and applied to the tread portion 47. At this stage, before curing of the contiguous tire parts 47 and 48, the pockets 41 and 42 are inflated with air under pressure. The necessary ducting in the former 40 to permit the introduction of pressurized air into the pockets 41 and 42 is not illustrated in FIGS. 4 and 5 but it will be understood that suitable axial and radial bores are formed in the former 40 communicating inlet pipe 52 co-axial with the stem 16 and stalk 18 with the pockets 41 and 42. The effect of inflating the pockets 41 is to displace the membrane 45 axially outwardly of the former 40 into engagement with the sidewalls 48. Because the radially outer surface of the former is held rigid by the breaker assembly 20 and the formed tread portion 47 in its cavity, and expansion of the membranes 45 axially of the former 40 is limited by the sidewalls 48, the membranes 45, as they emerge from the slits, tend to balloon radially inwardly of the former 40, deforming the radially inner lip of the slit to adopt the shape indicated by dotted lines in FIG. 5. By this means the ply edge 46 is displaced outwardly of the former 40 into contact with the reinforcement 49 of the sidewall 48. When the tire is thereafter cured the edges such as 46 of the carcass ply are bonded to the sidewall reinforcements, such as 49, to form an overlap joint and the former 40 is then removed from the interior of the finished tire.

Figure 6:
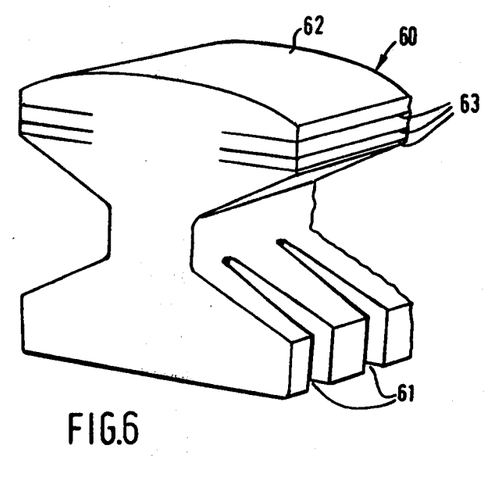
FIG. 6 is a perspective view of a section of a modified annular former in accordance with the invention.

To improve its capacity for radial expansion or contraction, the anchor block may be formed with circumferentially-spaced axially-extending slots 61, as shown on the modified former 60 illustrated in FIG. 6.

To improve its capacity for axial deformation under the pressure of the breaker and under moulding pressures without impairment of the resistance of the annulus 62 to radial compression the opposite axial ends of the annulus 62 may be formed with parallel slits 63 extending axially of the former. These slits 63 are of minimal extent radially of the former and the least possible former material is removed in making the slits 63.

Since the former 10, 40 or 60 is to remain within the tire during curing it should be of an elastomeric material having good heat resistance properties. It is also desirable that the former should have a suitable surface treatment, such as a baked-on silicone surface treatment, to facilitate release of the former from the interior of the completed tire.

The former may be restrained against axial elongation under the localized compressive forces which are generated during the introduction of uncured rubber into the mould cavity by wire or the like inextensible reinforcements (not shown) embedded in and extending axially of the former, e.g. 90° ply of steel tire cord, means being provided to fix the ends of each reinforcement relative to the ends of the former.

This fixing means may include or be constituted by inextensible circumferential annular reinforcements embedded in the axial ends of the former. These have the function of preventing radial expansion of the ends of the former while permitting radial movement of the central portion of the former. If the angle of taper of the inclined surfaces 14 and 15 is suitably chosen the effect of the closure of the platens 29 and 30 will be radially to expand the central area of the former without alteration of the diameter of its ends so that the radially outer surface of the former adopts the bowed configuration generally as illustrated in FIG. 1.

Having now described my invention — what I claim is:

1. A method of manufacturing at least a portion of a pneumatic tire, comprising:
   a. locating an annular, substantially inextensible breaker on the radially outer surface of a former, the former including an at least substantially solid annulus which is of greater axial length than radial thickness in radial cross-section and which is of an elastomeric material which yields to permit the diameter of the former to be increased or decreased;
   b. increasing the diameter of the former to stretch the breaker;
   c. locating the former with the breaker in the stretched condition thereon in a mould;
   d. moulding a tire tread portion over the stretched breaker;
   e. moulding a tire sidewall in contact with the tread portion;
   f. curing the moulded tire tread and sidewall; and
   g. removing the former from the interior of the cured tire tread and sidewall.

2. A method according to claim 1 wherein the step of locating the breaker on the former comprises:
   a. moving jaws axially inwardly of the former toward one another to grip the former, the former having a stem terminating in an anchor block on the radially inner side of the former, the jaws gripping the stem and being so shaped that when gripping the stem the radial outer surface of the former is exposed; and
   b. further moving the jaws radially inwardly to contract the former to a diameter less than that which the former has in the normal unstressed condition of the former; and wherein the step of increasing comprises:
   c. subsequently releasing the jaws from the former to bring the former to its normal diameter, so that the former stretches and finally holds the breaker.

3. A method according to claim 2 wherein the step of moulding the tire tread portion over the stretched breaker comprises engaging parts of a mould with the former to expand the former beyond the normal unstressed condition of the former, thereby further stretching the breaker.

4. A method according to claim 3 wherein the mould parts are similar in shape to the jaws, and wherein the step of engaging comprises:
   a. surrounding the former on all sides except the radially outer surface by the mould parts; and
   b. compressing the former between the mould parts and the breaker, the former being sufficiently rigid to withstand molding pressure when the tire tread is moulded over the stretched breaker.

5. A method as claimed in claim 1 wherein axial ends of the former have pockets, and further comprising:
   a. wrapping opposite edges of carcass plies of the breaker around the axial ends into the pockets; and
   b. inflating the pockets to displace the carcass ply edges into contact with the tire sidewalls, the inflating occurring subsequent to moulding the tire tread and moulding the tire sidewall but prior to curing.

* * * * *